Figure 1:
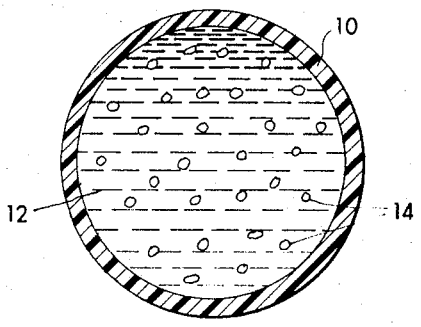
Figure 2:
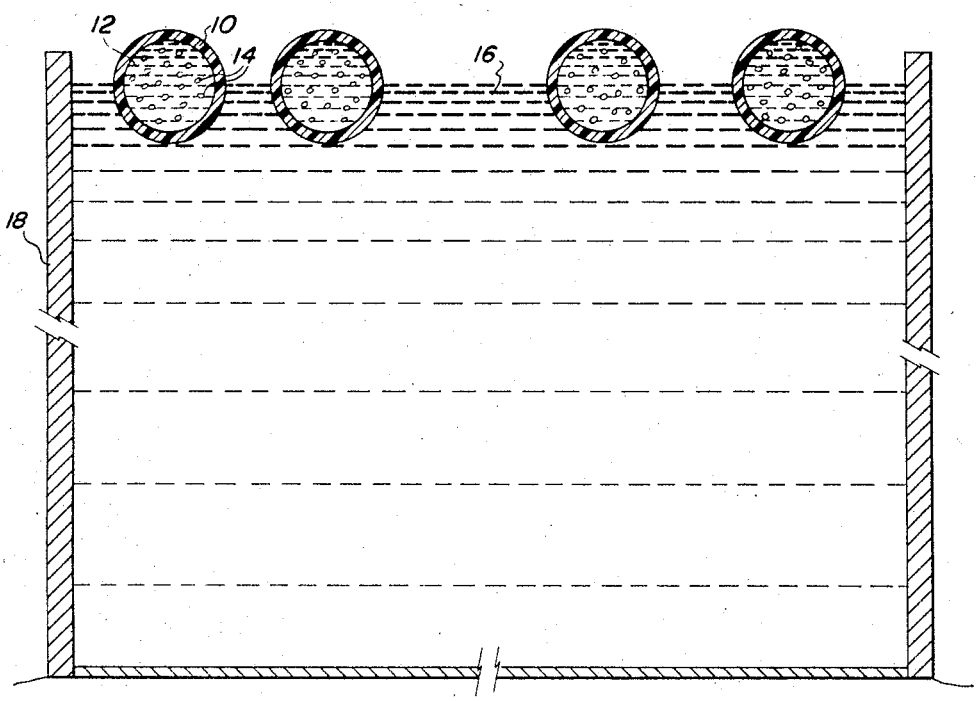

T861043

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 22, 1969

861 O.G. 1020

685,682

MICROENCAPSULATED FIRE EXTINGUISHING AGENT

George P. Gross, 900 Tice Place, Westfield, N.J. 07090, Walter A. Herbst, 93 Clark Place, Union, N.J. 07083, and Anthony Lagani, Jr., 600 Broad St., Newark, N.J. 07102

Filed Nov. 24, 1967. Published Apr. 22, 1969

Class 169—4

2 Sheets Drawing. 12 Pages Specification

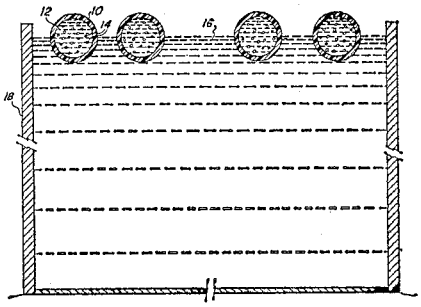

Microcapsules are adapted to contain a liquid or foam-producing fire-extinguishing agent and to release such agent when subjected to temperatures in a predetermined range. The microcapsules comprise a liquid fire-extinguishing agent such as carbon tetrachloride contained in a thin, hydrocarbon-impervious envelope which is rupturable by heat and/or pressure at a predetermined temperature range (e.g., 250°–450° F.) so as to release the fire-extinguishing agent in the event of a fire. In one embodiment, the microcapsules are comprised of a spherical outer polymeric (e.g., a copolymer of styrene and divinyl benzene) casing having enclosed therein water and entrapped air or inert gas such as nitrogen or carbon dioxide. In the preferred embodiment, the microcapsules have a density which is equal to or less than that of gasoline and which are added to fuel storage tanks, the tanks of racing cars, airplanes, etc., in order to provide both a fire-blanket and evaporaton-barrier for said fuel.

April 22, 1969 G. P. GROSS ET AL DEF. PUB. T861043

MICROENCAPSULATED FIRE EXTINGUISHING AGENT SN - 685682

Filed Nov. 24, 1967 Sheet 1 of 2

G. P. Gross
W. A. Herbst INVENTORS
A. Lagani, Jr.

April 22, 1969 G. P. GROSS ET AL DEF. PUB. T861043

MICROENCAPSULATED FIRE EXTINGUISHING AGENT SN - 685682

Filed Nov. 24, 1967 Sheet 2 of 2

G. P. Gross
W. A. Herbst Inventors
A. Lagani Jr.